United States Patent
Moore et al.

(10) Patent No.: US 9,088,355 B2
(45) Date of Patent: Jul. 21, 2015

(54) METHOD AND APPARATUS FOR DETERMINING THE DYNAMIC RANGE OF AN OPTICAL LINK IN AN HFC NETWORK

(75) Inventors: Charles S. Moore, Langhorne, PA (US); Robert J. Thompson, Horsham, PA (US); Michael J. Cooper, Marietta, GA (US); John L Moran, III, Uxbridge, MA (US)

(73) Assignee: ARRIS Technology, Inc., Suwanee, GA (US)

( * ) Notice: Subject to any disclaimer, the term of this patent is extended or adjusted under 35 U.S.C. 154(b) by 685 days.

(21) Appl. No.: 11/610,177

(22) Filed: Dec. 13, 2006

(65) Prior Publication Data
US 2007/0223920 A1    Sep. 27, 2007

Related U.S. Application Data

(60) Provisional application No. 60/785,648, filed on Mar. 24, 2006.

(51) Int. Cl.
*H04B 10/08* (2006.01)
*H04B 10/079* (2013.01)
*H04B 10/077* (2013.01)
*H04H 20/69* (2008.01)

(52) U.S. Cl.
CPC ........ *H04B 10/07955* (2013.01); *H04B 10/077* (2013.01); *H04H 20/69* (2013.01)

(58) Field of Classification Search
CPC ............... H04B 10/07; H04B 10/0773; H04B 10/0775; H04B 10/0793; H04B 10/0795; H04B 10/07955; H04B 10/077; H04H 20/69

USPC ............ 398/25, 31, 33, 34, 38; 370/351, 431, 370/464
See application file for complete search history.

(56) References Cited

U.S. PATENT DOCUMENTS

| | | |
|---|---|---|
| 3,838,221 A | 9/1974 | Schmidt et al. |
| 4,245,342 A | 1/1981 | Entenman |
| 4,385,392 A | 5/1983 | Angell et al. |
| 4,811,360 A | 3/1989 | Potter |
| 4,999,787 A | 3/1991 | McNally et al. |
| 5,197,064 A | 3/1993 | Chao et al. |

(Continued)

FOREIGN PATENT DOCUMENTS

| | | |
|---|---|---|
| DE | 69631420 T2 | 12/2004 |
| EP | 0905998 A2 | 3/1999 |

(Continued)

OTHER PUBLICATIONS

Office Action, Japanese App. No. 2008-557449 (Foreign Text and English Translation), Oct. 12, 2010.

(Continued)

*Primary Examiner* — M. R. Sedighian
(74) *Attorney, Agent, or Firm* — Stewart M. Wiener

(57) ABSTRACT

The dynamic range of an optical link in a network is determined by simultaneously transmitting signals from two network elements at first and second frequencies, which create a combined signal at a third frequency. The transmission power levels of selected network elements is successively increased until the measured power from the third frequency no longer changes in a predictable manner, at which point the upper limit of the dynamic range of the optical link is determined.

18 Claims, 4 Drawing Sheets

(56) References Cited

U.S. PATENT DOCUMENTS

| | | |
|---|---|---|
| 5,228,060 A | 7/1993 | Uchiyama |
| 5,251,324 A | 10/1993 | McMullan et al. |
| 5,271,060 A | 12/1993 | Moran, III et al. |
| 5,278,977 A | 1/1994 | Spencer et al. |
| 5,347,539 A | 9/1994 | Sridhar et al. |
| 5,390,339 A | 2/1995 | Bruckert et al. |
| 5,463,661 A | 10/1995 | Moran, III et al. |
| 5,532,865 A | 7/1996 | Utsumi et al. |
| 5,557,603 A | 9/1996 | Barlett et al. |
| 5,606,725 A | 2/1997 | Hart |
| 5,631,846 A | 5/1997 | Szurkowski |
| 5,692,010 A | 11/1997 | Nielsen |
| 5,694,437 A | 12/1997 | Yang et al. |
| 5,732,104 A | 3/1998 | Brown et al. |
| 5,757,526 A * | 5/1998 | Shiragaki et al. ............... 398/20 |
| 5,771,274 A | 6/1998 | Harris |
| 5,790,523 A | 8/1998 | Ritchie et al. |
| 5,862,451 A | 1/1999 | Grau et al. |
| 5,867,539 A | 2/1999 | Koslov |
| 5,870,429 A | 2/1999 | Moran, III et al. |
| 5,886,749 A | 3/1999 | Williams et al. |
| 5,939,887 A | 8/1999 | Schmidt et al. |
| 5,943,604 A | 8/1999 | Chen et al. |
| 6,032,019 A | 2/2000 | Chen et al. |
| 6,061,393 A | 5/2000 | Tsui et al. |
| 6,108,351 A | 8/2000 | Hardy et al. |
| 6,154,503 A | 11/2000 | Strolle |
| 6,229,792 B1 | 5/2001 | Anderson et al. |
| 6,230,326 B1 | 5/2001 | Unger et al. |
| 6,233,274 B1 | 5/2001 | Tsui et al. |
| 6,240,553 B1 | 5/2001 | Son et al. |
| 6,272,150 B1 | 8/2001 | Hrastar et al. |
| 6,278,730 B1 | 8/2001 | Tsui et al. |
| 6,308,286 B1 | 10/2001 | Richmond et al. |
| 6,310,909 B1 | 10/2001 | Jones |
| 6,321,384 B1 | 11/2001 | Eldering |
| 6,330,221 B1 | 12/2001 | Gomez |
| 6,334,219 B1 | 12/2001 | Hill et al. |
| 6,377,552 B1 | 4/2002 | Moran, III et al. |
| 6,385,773 B1 | 5/2002 | Schwartzman et al. |
| 6,389,068 B1 | 5/2002 | Smith et al. |
| 6,434,583 B1 | 8/2002 | Dapper et al. |
| 6,445,734 B1 | 9/2002 | Chen et al. |
| 6,456,597 B1 | 9/2002 | Bare |
| 6,459,703 B1 | 10/2002 | Grimwood et al. |
| 6,477,197 B1 | 11/2002 | Unger |
| 6,477,526 B2 | 11/2002 | Hayashi et al. |
| 6,480,469 B1 | 11/2002 | Moore et al. |
| 6,483,033 B1 | 11/2002 | Simoes et al. |
| 6,498,663 B1 | 12/2002 | Farhan et al. |
| 6,512,616 B1 | 1/2003 | Nishihara |
| 6,526,260 B1 | 2/2003 | Hick et al. |
| 6,546,557 B1 | 4/2003 | Ovadia |
| 6,556,239 B1 | 4/2003 | Al Araji et al. |
| 6,556,562 B1 | 4/2003 | Bhagavath et al. |
| 6,556,660 B1 | 4/2003 | Li et al. |
| 6,559,756 B2 | 5/2003 | Al-Araji et al. |
| 6,563,868 B1 | 5/2003 | Zhang et al. |
| 6,570,394 B1 | 5/2003 | Williams |
| 6,570,913 B1 | 5/2003 | Chen |
| 6,574,797 B1 | 6/2003 | Naegeli et al. |
| 6,588,016 B1 | 7/2003 | Chen et al. |
| 6,606,351 B1 | 8/2003 | Dapper et al. |
| 6,611,795 B2 | 8/2003 | Cooper |
| 6,646,677 B2 | 11/2003 | Noro et al. |
| 6,662,135 B1 | 12/2003 | Burns et al. |
| 6,662,368 B1 | 12/2003 | Cloonan et al. |
| 6,671,334 B1 | 12/2003 | Kuntz et al. |
| 6,687,632 B1 | 2/2004 | Rittman |
| 6,690,655 B1 | 2/2004 | Miner et al. |
| 6,700,875 B1 | 3/2004 | Schroeder et al. |
| 6,700,927 B1 | 3/2004 | Elsiger et al. |
| 6,711,134 B1 | 3/2004 | Wichelman et al. |
| 6,741,947 B1 | 5/2004 | Wichelman et al. |
| 6,748,551 B2 | 6/2004 | Furudate et al. |
| 6,757,253 B1 | 6/2004 | Cooper et al. |
| 6,772,388 B2 | 8/2004 | Cooper et al. |
| 6,772,437 B1 | 8/2004 | Cooper et al. |
| 6,775,840 B1 | 8/2004 | Naegel et al. |
| 6,785,473 B1 | 8/2004 | Sasaki et al. |
| 6,816,463 B2 | 11/2004 | Cooper et al. |
| 6,834,057 B1 | 12/2004 | Rabenko et al. |
| 6,839,829 B1 | 1/2005 | Daruwalla et al. |
| 6,853,932 B1 | 2/2005 | Wichelman et al. |
| 6,877,166 B1 | 4/2005 | Roeck et al. |
| 6,895,043 B1 | 5/2005 | Naegeli et al. |
| 6,895,594 B1 | 5/2005 | Simoes et al. |
| 6,906,526 B2 | 6/2005 | Hart, Jr. et al. |
| 6,928,475 B2 | 8/2005 | Schenkel et al. |
| 6,944,881 B1 | 9/2005 | Vogel |
| 6,961,314 B1 | 11/2005 | Quigley et al. |
| 6,961,370 B2 | 11/2005 | Chappell |
| 6,967,994 B2 | 11/2005 | Boer et al. |
| 6,973,141 B1 | 12/2005 | Isaksen et al. |
| 6,985,437 B1 | 1/2006 | Vogel |
| 6,987,754 B2 | 1/2006 | Shahar et al. |
| 6,999,408 B1 | 2/2006 | Gomez |
| 7,002,899 B2 | 2/2006 | Azenkot et al. |
| 7,010,002 B2 | 3/2006 | Chow et al. |
| 7,017,176 B1 | 3/2006 | Lee et al. |
| 7,027,685 B2 * | 4/2006 | Harres ........................... 385/24 |
| 7,032,159 B2 | 4/2006 | Lusky et al. |
| 7,039,939 B1 | 5/2006 | Millet et al. |
| 7,050,419 B2 | 5/2006 | Azenkot et al. |
| 7,054,554 B1 | 5/2006 | McNamara et al. |
| 7,058,007 B1 | 6/2006 | Daruwalla et al. |
| 7,072,365 B1 | 7/2006 | Ansley |
| 7,079,457 B2 | 7/2006 | Wakabayashi et al. |
| 7,099,412 B2 | 8/2006 | Coffey |
| 7,099,580 B1 * | 8/2006 | Bulbul ............................. 398/9 |
| 7,139,283 B2 | 11/2006 | Quigley et al. |
| 7,142,609 B2 | 11/2006 | Terreault et al. |
| 7,145,887 B1 | 12/2006 | Akgun et al. |
| 7,152,025 B2 | 12/2006 | Lusky et al. |
| 7,158,542 B1 | 1/2007 | Zeng et al. |
| 7,164,694 B1 | 1/2007 | Nodoushani et al. |
| 7,177,324 B1 | 2/2007 | Choudhury et al. |
| 7,197,067 B2 | 3/2007 | Lusky et al. |
| 7,209,656 B2 * | 4/2007 | Peddanarappagari et al. .. 398/38 |
| 7,222,255 B1 | 5/2007 | Claessens et al. |
| 7,227,863 B1 | 6/2007 | Leung et al. |
| 7,242,862 B2 | 7/2007 | Saunders et al. |
| 7,246,368 B1 | 7/2007 | Millet et al. |
| 7,263,123 B2 | 8/2007 | Yousef |
| 7,274,735 B2 | 9/2007 | Lusky et al. |
| 7,286,756 B1 | 10/2007 | Marshall et al. |
| 7,295,518 B1 | 11/2007 | Monk et al. |
| 7,315,573 B2 | 1/2008 | Lusky et al. |
| 7,315,967 B2 | 1/2008 | Azenko et al. |
| 7,400,677 B2 | 7/2008 | Jones |
| 7,421,276 B2 | 9/2008 | Steer et al. |
| 7,451,472 B2 | 11/2008 | Williams |
| 7,492,703 B2 | 2/2009 | Lusky et al. |
| 7,554,902 B2 | 6/2009 | Kim et al. |
| 7,573,884 B2 | 8/2009 | Klimker et al. |
| 7,573,935 B2 | 8/2009 | Min et al. |
| 7,584,298 B2 | 9/2009 | Klinker et al. |
| 7,616,654 B2 | 11/2009 | Moran et al. |
| 7,650,112 B2 | 1/2010 | Utsumi et al. |
| 7,672,310 B2 | 3/2010 | Cooper et al. |
| 7,684,315 B1 | 3/2010 | Beser |
| 7,684,341 B2 | 3/2010 | Howald |
| 7,693,042 B1 | 4/2010 | Wei |
| 7,693,090 B1 | 4/2010 | Kimpe |
| 7,701,938 B1 | 4/2010 | Bernstein et al. |
| 7,716,712 B2 | 5/2010 | Booth et al. |
| 7,739,359 B1 | 6/2010 | Millet et al. |
| 7,742,697 B2 | 6/2010 | Cooper et al. |
| 7,742,771 B2 | 6/2010 | Thibeault |
| 7,760,624 B1 | 7/2010 | Goodson et al. |
| 7,764,231 B1 | 7/2010 | Karr et al. |
| 7,778,314 B2 | 8/2010 | Wajcer et al. |
| 7,787,557 B2 | 8/2010 | Kim et al. |
| 7,792,183 B2 | 9/2010 | Massey et al. |

(56) References Cited

U.S. PATENT DOCUMENTS

| | | |
|---|---|---|
| 7,826,569 B2 | 11/2010 | Popper et al. |
| 7,856,049 B2 | 12/2010 | Currivan et al. |
| 7,876,697 B2 | 1/2011 | Thompson et al. |
| 7,953,144 B2 | 5/2011 | Allen et al. |
| 7,958,534 B1 | 6/2011 | Beser |
| 7,970,010 B2 | 6/2011 | Denney et al. |
| 7,983,162 B1 | 7/2011 | Ford et al. |
| 8,000,254 B2 | 8/2011 | Thompson et al. |
| 8,037,541 B2 | 10/2011 | Montague et al. |
| 8,040,915 B2 | 10/2011 | Cummings |
| 8,059,546 B2 | 11/2011 | Pai et al. |
| 8,081,674 B2 | 12/2011 | Thompson et al. |
| 8,116,360 B2 | 2/2012 | Thibeault |
| 8,265,559 B2 | 9/2012 | Cooper et al. |
| 8,279,764 B2 | 10/2012 | Cooper et al. |
| 8,284,828 B2 | 10/2012 | Cooper et al. |
| 8,345,557 B2 | 1/2013 | Thibeault et al. |
| 8,526,485 B2 | 9/2013 | Thompson et al. |
| 8,537,972 B2 | 9/2013 | Thompson et al. |
| 8,594,118 B2 | 11/2013 | Cooper et al. |
| 2001/0055319 A1 | 12/2001 | Quigley et al. |
| 2002/0038461 A1 | 3/2002 | White et al. |
| 2002/0044531 A1 | 4/2002 | Cooper et al. |
| 2002/0091970 A1 | 7/2002 | Furudate et al. |
| 2002/0116493 A1 | 8/2002 | Schenkel et al. |
| 2002/0119783 A1 | 8/2002 | Bourlas et al. |
| 2002/0154620 A1 | 10/2002 | Azenkot et al. |
| 2002/0168131 A1 | 11/2002 | Walter et al. |
| 2002/0181395 A1 | 12/2002 | Foster et al. |
| 2003/0028898 A1 | 2/2003 | Howald |
| 2003/0043732 A1 | 3/2003 | Walton et al. |
| 2003/0067883 A1 | 4/2003 | Azenkot et al. |
| 2003/0067944 A1 | 4/2003 | Sala et al. |
| 2003/0101463 A1 | 5/2003 | Greene et al. |
| 2003/0108052 A1 | 6/2003 | Inoue et al. |
| 2003/0120819 A1 | 6/2003 | Abramson et al. |
| 2003/0138250 A1 | 7/2003 | Glynn |
| 2003/0149991 A1 | 8/2003 | Reidhead et al. |
| 2003/0158940 A1 | 8/2003 | Leigh |
| 2003/0179768 A1 | 9/2003 | Lusky et al. |
| 2003/0179770 A1 | 9/2003 | Reznic et al. |
| 2003/0179821 A1 | 9/2003 | Lusky et al. |
| 2003/0181185 A1 | 9/2003 | Lusky et al. |
| 2003/0182664 A1 | 9/2003 | Lusky et al. |
| 2003/0185176 A1 | 10/2003 | Lusky et al. |
| 2003/0188254 A1 | 10/2003 | Lusky et al. |
| 2003/0200317 A1 | 10/2003 | Zeitak et al. |
| 2003/0212999 A1 | 11/2003 | Cai |
| 2004/0015765 A1 | 1/2004 | Cooper et al. |
| 2004/0042385 A1 | 3/2004 | Kim et al. |
| 2004/0047284 A1 | 3/2004 | Eidson |
| 2004/0052248 A1 | 3/2004 | Frank et al. |
| 2004/0052356 A1 | 3/2004 | McKinzie et al. |
| 2004/0062548 A1* | 4/2004 | Obeda et al. .................. 398/25 |
| 2004/0073937 A1 | 4/2004 | Williams |
| 2004/0096216 A1 | 5/2004 | Ito |
| 2004/0109661 A1 | 6/2004 | Bierman et al. |
| 2004/0139473 A1 | 7/2004 | Greene |
| 2004/0163129 A1 | 8/2004 | Chapman et al. |
| 2004/0181811 A1 | 9/2004 | Rakib |
| 2004/0208513 A1* | 10/2004 | Peddanarappagari et al. .. 398/25 |
| 2004/0233234 A1 | 11/2004 | Chaudhry et al. |
| 2004/0233926 A1 | 11/2004 | Cummings |
| 2004/0248520 A1 | 12/2004 | Miyoshi |
| 2004/0261119 A1 | 12/2004 | Williams et al. |
| 2005/0010958 A1 | 1/2005 | Rakib et al. |
| 2005/0025145 A1 | 2/2005 | Rakib et al. |
| 2005/0034159 A1 | 2/2005 | Ophir et al. |
| 2005/0039103 A1 | 2/2005 | Azenko et al. |
| 2005/0058082 A1 | 3/2005 | Moran et al. |
| 2005/0064890 A1 | 3/2005 | Johan et al. |
| 2005/0097617 A1 | 5/2005 | Currivan et al. |
| 2005/0099951 A1 | 5/2005 | Mohan et al. |
| 2005/0108763 A1 | 5/2005 | Baran et al. |
| 2005/0122996 A1 | 6/2005 | Azenkot et al. |
| 2005/0163088 A1 | 7/2005 | Yamano et al. |
| 2005/0175080 A1 | 8/2005 | Bouillett |
| 2005/0183130 A1 | 8/2005 | Sadja et al. |
| 2005/0198688 A1 | 9/2005 | Fong |
| 2005/0226161 A1 | 10/2005 | Jaworski |
| 2005/0281200 A1 | 12/2005 | Terreault |
| 2006/0013147 A1 | 1/2006 | Terpstra et al. |
| 2006/0088056 A1 | 4/2006 | Quigley et al. |
| 2006/0121946 A1 | 6/2006 | Walton et al. |
| 2006/0250967 A1 | 11/2006 | Miller et al. |
| 2006/0262722 A1 | 11/2006 | Chapman et al. |
| 2006/0291503 A1 | 12/2006 | Chapman |
| 2007/0002752 A1 | 1/2007 | Thibeault et al. |
| 2007/0030805 A1 | 2/2007 | Pantelias et al. |
| 2007/0058542 A1 | 3/2007 | Thibeault |
| 2007/0076592 A1 | 4/2007 | Thibeault et al. |
| 2007/0076789 A1 | 4/2007 | Thibeault |
| 2007/0076790 A1 | 4/2007 | Thibeault et al. |
| 2007/0086328 A1 | 4/2007 | Kao et al. |
| 2007/0094691 A1 | 4/2007 | Gazdzinski |
| 2007/0097907 A1 | 5/2007 | Cummings |
| 2007/0121712 A1 | 5/2007 | Okamoto |
| 2007/0133672 A1 | 6/2007 | Lee et al. |
| 2007/0143654 A1 | 6/2007 | Joyce et al. |
| 2007/0147489 A1 | 6/2007 | Sun et al. |
| 2007/0177526 A1 | 8/2007 | Siripunkaw et al. |
| 2007/0184835 A1 | 8/2007 | Bitran et al. |
| 2007/0189770 A1 | 8/2007 | Sucharczuk et al. |
| 2007/0201547 A1 | 8/2007 | Willcocks et al. |
| 2007/0206600 A1 | 9/2007 | Klimker et al. |
| 2007/0206625 A1 | 9/2007 | Maeda |
| 2007/0211618 A1 | 9/2007 | Cooper et al. |
| 2007/0223512 A1 | 9/2007 | Cooper et al. |
| 2007/0223513 A1 | 9/2007 | Pantelias et al. |
| 2007/0223920 A1 | 9/2007 | Moore et al. |
| 2007/0245177 A1 | 10/2007 | Cooper et al. |
| 2008/0056713 A1 | 3/2008 | Cooper et al. |
| 2008/0062888 A1 | 3/2008 | Lusky et al. |
| 2008/0065960 A1 | 3/2008 | Cheng et al. |
| 2008/0069006 A1 | 3/2008 | Walter et al. |
| 2008/0075157 A1 | 3/2008 | Allen et al. |
| 2008/0101210 A1 | 5/2008 | Thompson et al. |
| 2008/0125984 A1 | 5/2008 | Skendzic et al. |
| 2008/0140823 A1 | 6/2008 | Thompson et al. |
| 2008/0193137 A1 | 8/2008 | Thompson et al. |
| 2008/0200129 A1 | 8/2008 | Cooper et al. |
| 2008/0242339 A1 | 10/2008 | Anderson |
| 2008/0250508 A1 | 10/2008 | Montague et al. |
| 2008/0274700 A1 | 11/2008 | Li |
| 2008/0291840 A1 | 11/2008 | Cooper et al. |
| 2009/0031384 A1 | 1/2009 | Brooks et al. |
| 2009/0103557 A1 | 4/2009 | Hong et al. |
| 2009/0103669 A1 | 4/2009 | Kolze et al. |
| 2009/0109877 A1 | 4/2009 | Murray et al. |
| 2009/0158096 A1 | 6/2009 | Ali et al. |
| 2009/0249421 A1 | 10/2009 | Liu et al. |
| 2009/0252234 A1 | 10/2009 | Samdani et al. |
| 2010/0083356 A1 | 4/2010 | Steckley et al. |
| 2010/0095360 A1 | 4/2010 | Pavlovski et al. |
| 2010/0128739 A1 | 5/2010 | Jung et al. |
| 2010/0154016 A1 | 6/2010 | Li et al. |
| 2010/0154017 A1 | 6/2010 | An et al. |
| 2010/0157824 A1 | 6/2010 | Thompson et al. |
| 2010/0158093 A1 | 6/2010 | Thompson et al. |
| 2010/0185391 A1 | 7/2010 | Lee et al. |
| 2010/0223650 A1 | 9/2010 | Millet et al. |
| 2010/0251320 A1 | 9/2010 | Shafer et al. |
| 2010/0322390 A1 | 12/2010 | Bialk et al. |
| 2011/0026577 A1 | 2/2011 | Primo et al. |
| 2011/0030019 A1 | 2/2011 | Ulm et al. |
| 2011/0069745 A1 | 3/2011 | Thompson et al. |
| 2011/0072127 A1 | 3/2011 | Gerber et al. |
| 2011/0099570 A1 | 4/2011 | Sadja et al. |
| 2011/0110415 A1 | 5/2011 | Cooper et al. |
| 2011/0150058 A1 | 6/2011 | Oh |
| 2011/0153683 A1 | 6/2011 | Hoskinson |
| 2011/0194418 A1 | 8/2011 | Wolcott et al. |
| 2011/0194597 A1 | 8/2011 | Wolcott et al. |
| 2011/0197071 A1 | 8/2011 | Wolcott et al. |

(56) References Cited

U.S. PATENT DOCUMENTS

| | | | |
|---|---|---|---|
| 2011/0243214 | A1 | 10/2011 | Wolcott et al. |
| 2012/0027069 | A1 | 2/2012 | Clausen et al. |
| 2012/0054312 | A1 | 3/2012 | Salinger |
| 2012/0084416 | A1 | 4/2012 | Thibeault et al. |
| 2012/0093240 | A1 | 4/2012 | McFarland et al. |
| 2012/0115505 | A1 | 5/2012 | Miyake et al. |
| 2012/0147751 | A1 | 6/2012 | Ulm |
| 2012/0190380 | A1 | 7/2012 | Dupray et al. |
| 2013/0003565 | A1 | 1/2013 | Gotwals et al. |
| 2013/0041990 | A1 | 2/2013 | Thibeault et al. |
| 2013/0051442 | A1 | 2/2013 | Cooper et al. |
| 2013/0070772 | A1 | 3/2013 | Watson et al. |
| 2013/0128723 | A1 | 5/2013 | Thibeault et al. |
| 2013/0148707 | A1 | 6/2013 | Thibeault et al. |
| 2013/0286852 | A1 | 10/2013 | Bowler et al. |
| 2013/0290783 | A1 | 10/2013 | Bowler et al. |
| 2013/0290791 | A1 | 10/2013 | Basile et al. |
| 2013/0291034 | A1 | 10/2013 | Basile et al. |
| 2013/0294489 | A1 | 11/2013 | Thibeault et al. |
| 2014/0029654 | A1 | 1/2014 | Thompson et al. |
| 2014/0029655 | A1 | 1/2014 | Thompson et al. |
| 2014/0133533 | A1 | 5/2014 | Thibeault et al. |
| 2014/0185428 | A1 | 7/2014 | Thibeault et al. |
| 2014/0267788 | A1 | 9/2014 | Bowler et al. |
| 2014/0269416 | A1 | 9/2014 | Bowler et al. |
| 2014/0269869 | A1 | 9/2014 | Bowler et al. |
| 2014/0270095 | A1 | 9/2014 | Bowler et al. |
| 2014/0278273 | A1 | 9/2014 | Bowler et al. |

FOREIGN PATENT DOCUMENTS

| | | | |
|---|---|---|---|
| EP | 1235402 | A2 | 8/2002 |
| EP | 1341335 | A2 | 9/2003 |
| EP | 1956782 | A1 | 8/2008 |
| JP | 55132161 | A | 10/1980 |
| JP | 04208707 | A | 7/1992 |
| JP | 6120896 | A | 4/1994 |
| JP | 6177840 | A | 6/1994 |
| JP | 09008738 | A | 1/1997 |
| JP | 9162816 | A | 6/1997 |
| JP | 10247893 | A | 9/1998 |
| JP | 11230857 | A | 8/1999 |
| JP | 2001044956 | A | 2/2001 |
| JP | 2003530761 | A | 10/2003 |
| JP | 2004172783 | A | 6/2004 |
| JP | 2004343678 | A | 12/2004 |
| WO | 0192901 | A1 | 6/2001 |
| WO | 0233974 | A1 | 4/2002 |
| WO | 2004062124 | A1 | 7/2004 |
| WO | 2007046876 | A1 | 4/2007 |
| WO | 2009146426 | A1 | 12/2009 |

OTHER PUBLICATIONS

Cable Television Laboratories, Inc., "A Simple Algorithm for Fault Localization Using Naming Convention and Micro-reflection Signature," Invention Disclosure 60193, 2 pages, Jun. 2008.
Cable Television Laboratories, Inc., "Data-Over-Cable Service Interface Specifications DOCSIS 3.0: MAC and Upper Layer Protocols Interface," CM-SP-MULPIv3.0-I16-110623, section 8, pp. 242-266, Jun. 2011.
Cable Television Laboratories, Inc., "Data-Over-Cable Service Interface Specifications DOCSIS® 3.0—MAC and Upper Layer Protocols Interface Specification," CM-SP-MULPIv3.0-I17-111117, Nov. 2011.
Cable Television Laboratories, Inc., "DOCSIS Best Practices and Guidelines: Proactive Network Maintenance Using Pre-Equalization," CM-GL-PNMP-V01-100415, Apr. 2010.
Cable Television Laboratories, Inc., "Pre-Equalization Based Proactive Network Maintenance Process Model for CMs Transmitting on Multiple Upstream Channels," Invention Disclosure 60203, 2 pages, May 2009.
Cable Television Laboratories, Inc., "Pre-Equalization based proactive network maintenance process model", Invention Disclosure 60177, 2 pages, Jun. 2008.
Cable Television Laboratories, Inc., "DOCSIS® Best Practices and Guidelines: Proactive Network Maintenance Using Pre-equalization," CM-GL-PNMP-V02-110623, Jun. 2011.
Cable Television Laboratories, Inc., "Data-Over-Cable Service Interface Specifications: DOCSIS 2.0 Radio Frequency Interface Specification," CM-SP-RFIv2.0-I06-040804, Apr. 2004.
L.A. Campos, et al., "Pre-equalization based Pro-active Network Maintenance Methodology", Cable Television Laboratories, Inc., presentation, 32 pages, 2008.
R.L. Howald, et al., "Customized Broadband—Analysis Techniques for Blended Multiplexes," NCTA Technical Papers, 2002.
R. Howald, "Access Networks Solutions: Introduction to S-CDMA," Presentation to Society of Cable Telecommunications Engineers (SCTE) South Florida Chapter, 2009.
R. Howald, "Upstream Snapshots & Indicators (2009)," Regional Samples, Presentation to Society of Cable Telecommunications Engineers (SCTE) South Florida Chapter, Jan. 2010.
R.L. Howald et al., "Characterizing and Aligning the HFC Return Path for Successful DOCSIS 3.0 Rollouts", SCTE Cable-Tec Expo, Oct. 2009.
R. Howald, et al., "DOCSIS 3.0 Upstream: Readiness & Qualification," SCTE Cable-Tec Expo, Oct. 2009.
R. Howald, et al., "The Grown-Up Potential of a Teenage PHY", NCTA Convention and Exposition, May 2012.
R. Howald, "DOCSIS 3.0 Upstream: Technology, RF Variables & Case Studies," Access Networks Solutions, 2009, presentation to Society of Cable Telecommunications Engineers (SCTE) South Florida Chapter, 23 pages, Jan. 2010.
R. Hranac, "Linear Distortions, Part 1," Communication Technology, Jul. 2005.
X. Liu, et al., "Variable Bit Rate Video Services in DOCSIS 3.0 Networks," NCTA Technical Papers, 2008.
Motorola, Inc., "White Paper: Expanding Bandwidth Using Advanced Spectrum Management," Sep. 25, 2003.
H. Newton, Newton's Telecom Dictionary, Flatiron Publishing, 9th ed., pp. 216 and 1023 (definitions of "carrier to noise ratio" and "signal to noise ratio"), Sep. 1995.
M. Patrick, et al., "Delivering Economical IP Video over DOCSIS by Bypassing the M-CMTS with DIBA," SCTE 2007 Emerging Technologies, NCTA Technical Papers, 2007.
A. Popper, et al., "An Advanced Receiver with Interference Cancellation for Broadband Cable Networks," 2002 International Zurich Seminar on Broadband Communications—Access, Transmission, Networking, pp. 23-1-23-6, IEEE, 2002.
A. Popper, et al, "Ingress Noise Cancellation for the Upstream Channel in Broadband Cable Access Systems," 2002 IEEE International Conference on Communications, vol. 3, pp. 1808-1812. IEEE, 2002.
S.U.H. Qureshi, "Adaptive Equalization," Proceedings of the IEEE, vol. 73, No. 9, pp. 1349-1387, Sep. 1985.
S. Ramakrishnan, "Scaling the DOCSIS Network for IPTV," SCTE Conference on Emerging Technologies, NCTA Cable Show, Apr. 2009.
Y.R. Shelke, "Knowledge Based Topology Discovery and Geo-localization", Thesis, Master of Science, Ohio State University, 2010.
R. Thompson, et al., "256-QAM for Upstream HFC," NCTA 2010 Spring Technical Forum Proceedings, pp. 142-152, May 2010.
R. Thompson, et al., "256-QAM for Upstream HFC Part Two", SCTE Cable-Tec Expo 2011, Technical Paper, Nov. 2011.
R. Thompson, et al., "Multiple Access Made Easy," SCTE Cable-Tec Expo 2011, Technical Paper, Nov. 2011.
R. Thompson, et al., "Optimizing Upstream Throughput Using Equalization Coefficient Analysis", National Cable & Telecommunications Association (NCTA) Technical Papers, Apr. 2009.
R. Thompson, et al., "Practical Considerations for Migrating the Network Toward All-Digital", Society of Cable Telecommunications Engineers (SCTE) Cable-Tec Expo, Oct. 2009.
R. Thompson, et al., "64-QAM, 6.4MHz Upstream Deployment Challenges," SCTE Canadian Summit, Toronto, Canada, Technical Paper, Mar. 2011.

(56) References Cited

OTHER PUBLICATIONS

B. Volpe, et al., "Cable-Tec Expo 2011: Advanced Troubleshooting in a DOCSIS© 3.0 Plant," Nov. 2011.

L. Wolcott, "Modem Signal Usage and Fault Isolation," U.S. Appl. No. 61/301,835, filed Feb. 5, 2010.

F. Zhao, et al., "Techniques for minimizing error propagation in decision feedback detectors for recording channels," IEEE Transactions on Magnetics, vol. 37, No. 1, pp. 592-602, Jan. 2001.

Y. Morishita, et al., "An LMS adaptive equalizer using threshold in impulse noise environments", IEEE, ICT 2003 10th International Conference on Telecommunications, vol. 1, pp. 578-582, Feb. 2003.

Office Action, German App. No. 11 2007 000 663.3-35 (Foreign Text and English Translation), Aug. 30, 2011.

PCT International Search Report and Written Opinion for PCT/US07/62417—Dated Dec. 21, 2007.

European Search Report for EP 07017516, dated Feb. 20, 2008.

\* cited by examiner

METHOD AND APPARATUS FOR DETERMINING THE DYNAMIC RANGE OF AN OPTICAL LINK IN AN HFC NETWORK

This application claims the benefit of U.S. Provisional Application No. 60/785,648 filed on Mar. 24, 2006, titled "Laser Dynamic Range Test", herein incorporated by reference in its entirety.

FIELD OF THE INVENTION

This disclosure is directed toward determining the dynamic range of an optical link in an HFC network. More particularly, this disclosure is directed toward an automated approach to detecting an upper limit to the dynamic range of an optical link including the occurrence of laser clipping.

BACKGROUND OF THE INVENTION

Hybrid fiber coaxial (HFC) cable television systems have been in widespread use for many years and extensive networks have been developed. A typical HFC network generally contains a headend which provide communications between user in the HFC network and the IP/PSTN networks. The headend usually contains a cable modem termination system (CMTS) containing several receivers, each receiver handling communications between hundreds of end user network elements. The headend is generally connected to several nodes and each node is connected to many network elements, such as data over cable system (DOCSIS) terminal network elements (e.g. media terminal adapters (MTA) or cable modems), e.g., a single node may be connected to hundreds of modems. In many instances several nodes may serve a particular area of a town or city.

A typical HFC network uses optical fiber for communications between the headend and the nodes, and uses coaxial cable for communications between the nodes and the end users. Downstream optical communications over the optical fiber are typically converted at the nodes to RF communications for transmission over the coaxial cable. Conversely, upstream (or return path) RF communications from the users are provided over the coaxial cables and are typically converted at the nodes to optical communications for transmission over the optical fiber. The return path optical link (the optical components in the HFC network, e.g. the transmission lasers, optical receivers, and optical fibers) contribute to the performance of the HFC network. More particularly, the optical components contribute to the quality of signals received by the CMTS from the users, and may cause distortion of the signals or otherwise degrade their quality.

Driving the RF input power too high at the optical transmitter in the return path on a node, via either mismanagement of the active channels or ingress noise, often creates excess distortion and degrades the quality of the received signals at the CMTS. This overdriving condition is typically known as laser clipping, which may be corrected by properly managing the RF input power to the transmitter and allowing for adequate headroom to withstand ingress events.

However, the cause for the overdriving condition and laser clipping is often difficult to detect when it occurs due to the burstiness of the signals typically present on the return path. Currently, diagnosing the cause for laser clipping requires a technician or engineer to be at multiple locations within the HFC plant simultaneously with specialized test equipment, such as a vector signal analyzer and signal generators. This manual diagnostic process is labor intensive, time consuming and costly.

SUMMARY OF THE INVENTION

This disclosure explains an automated process to determine dynamic range of the return path optical link in conjunction with measurements made at the headend via a CMTS device, which does not require rolling trucks to remote locations within a HFC plant.

In accordance with principles of the invention, an apparatus for measuring a network may comprise: a controller configured to instruct a first network element to transmit a first signal at a first frequency f1 and a second network element to transmit a second signal at a second frequency f2 so that the first signal and the second signal are received by a common node at the same time; a receiver configured to receive communications on a third frequency f3 based on the first signal from the first network element and the second signal from the second network element, whereby the third frequency f3 is a combination of the first signal from the first network element at the first frequency f1 and the second signal from the second network element at the second frequency f2; and a power monitoring unit which is configured to measure power in signals contained in the third frequency, wherein the controller is configured to determine a dynamic range of an optical link based on the measured power in the signals contained in the third frequency.

An upper limit to the dynamic range of the optical link may be determined when an increase in power level in frequency f3 is not in a predictable manner.

Also in accordance with the present invention a method for determining a dynamic range of an optical link in a network may comprise the steps of: selecting a first network element to transmit a first signal at a first frequency f1 and a second network element to transmit a second signal at a second frequency f2 so that the first signal and the second signal are received by a common node at the same time; receiving communications on a third frequency f3, whereby the third frequency f3 is a combination of the first signal from the first network element at the first frequency f1 and the second signal from the second network element at the second frequency f2; measuring power in signals contained in the third frequency; and determining a dynamic range of an optical link based on the measured power in the signals contained in the third frequency.

In accordance with the principles of the invention, a computer readable medium carrying instructions for a computer to perform a method for determining a dynamic range of an optical link in a network may comprise the steps of: selecting a first network element to transmit a first signal at a first frequency f1 and a second network element to transmit a second signal at a second frequency f2 so that the first signal and the second signal are received by a common node at the same time; receiving communications on a third frequency f3, whereby the third frequency f3 is a combination of the first signal from the first network element at the first frequency f1 and the second signal from the second network element at the second frequency f2; measuring power in signals contained in the third frequency; and determining a dynamic range of an optical link based on the measured power in the signals contained in the third frequency.

The invention enables the technician or engineer to remotely characterize upstream dynamic range (or headroom) of optical links at a central location, such as the headened, such as by using the Motorola BSR64000, rather than using external test equipment, such as the vector signal analyzer and deploying technicians to various locations within the cable plant. The invention also avoids impacting active services. It also allows the cable operator to plan for future offerings and schedule needed maintenance by allowing periodic monitoring of the dynamic range of the optical link. All measurements may be made through the use of the existing terminal devices (specifically, DOCSIS terminal devices such as MTAs and cable modems) as well as headend equipment (specifically a DOCSIS CMTS).

Accurate knowledge of the dynamic range (or headroom) of an optical link will enable an operator to utilize the available resources of their network more efficiently, such as by adding additional network elements to portions of the network, which has a limited dynamic range, to avoid disruption of the signals from the optical link and to improve signal quality and network speed.

BRIEF DESCRIPTION OF THE DRAWINGS

The following drawings serve to illustrate the principles of the invention.

DETAILED DESCRIPTION OF THE INVENTION

This disclosure provides for a dynamic range characterization of an optical link and the identification of available upstream frequency regions which would support communications. The methodology described in this invention instructs two DOCSIS terminal devices (cable modems or MTAs) to transmit simultaneously and measures the affects on a third frequency communication channel. Subsequently, power is increased for the two DOCSIS terminal devices until, nonlinear behavior at a known distortion frequency location is detected. That is, it monitors the affects of increasing power in the return-path of the cable network on a communications signal and logs the total power added when the power no longer changes in a predictable manner. The approach detailed in this disclosure requires that the two DOCSIS terminal devices reside on the same optical node. A methodology for isolating devices which reside on the same optical node is provided in a commonly assigned disclosure Attorney Docket No. BCS04122, entitled METHOD AND APPARATUS FOR GROUPING TERMINAL NETWORK DEVICES filed on Sep. 5, 2006 and assigned U.S. Ser. No. 11/470,034, herein incorporated by reference in its entirety. Preferably, the dynamic range test should not occur in conjunction with other changes in the network, such as changing of optical routing, ingress level switching or any other routine or event that will likely cause RF levels to be unstable.

Adequate margin should also preferably be available in the network to allow the addition of 2 DOCSIS channels. A methodology for determining the available power margin in a network is described in commonly assigned disclosure Attorney Docket No. BCS04121, entitled METHOD AND APPARATUS FOR DETERMINING THE TOTAL POWER MARGIN AVAILABLE FOR AN HFC NETWORK filed on Oct. 20, 2006 and assigned U.S. Ser. No. 11/551,014, herein incorporated by reference in its entirety.

Preferably, an active Return Path is providing services at the time that the operator desires to associate (group) network elements according to common optical nodes. Also, this test picks test frequency locations based upon avoiding interference of $2^{nd}$ order intermods on active data services. We are assuming adequate margin is available such that $3^{rd}$ order products are not a problem for the active services.

Figure 1:
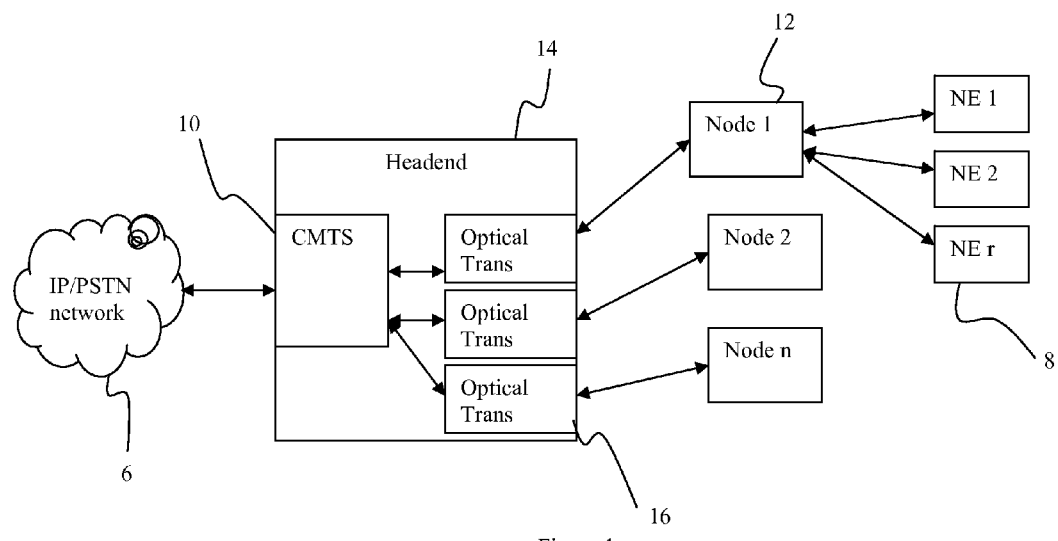
FIG. 1 illustrates an exemplary network in accordance with the principles of the invention.

FIG. 1 illustrates an exemplary network in which a plurality of terminal network elements 8 (e.g. cable modems, set top boxes, televisions equipped with set top boxes, or any other element on a network such as an HFC network) are connected to a cable modem termination system (CMTS) 10 located in a headend 14 through nodes 12 and one or more taps (not shown). In an exemplary arrangement, headend 14 also contains an optical transceiver 16 which provides optical communications through an optical fiber to the plurality of nodes 12. The CMTS 10 connects to an IP or PSTN network 6. Those of skill in the art will appreciate that there may be a plurality of nodes 12 connected to a headend, and a headend may contain a plurality of CMTS units, each of which contain a plurality of receivers (e.g. 8 receivers) each of which communicate with a plurality (e.g. 100 s) of network elements 8. The CMTS 10 may also contain a spare receiver which is not continuously configured to network elements 8, but may be selectively configured to network elements 8. Use of a spare receiver is described in commonly assigned patent application Ser. No. 11/171,066, filed on Jun. 30, 2005 and titled Automated Monitoring of a Network, herein incorporated by reference in its entirety.

Figure 2:
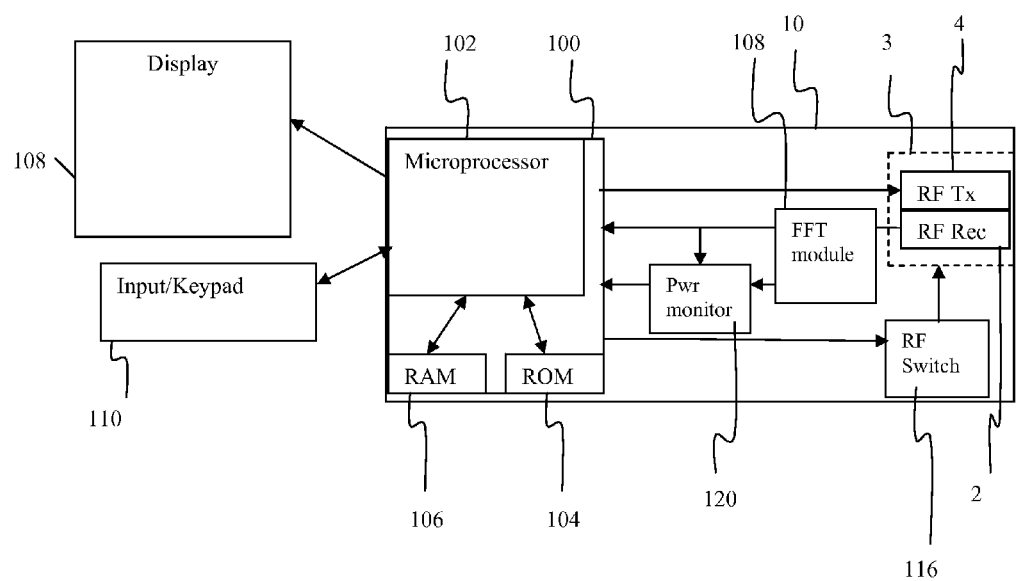
FIG. 2 illustrates an exemplary CMTS architecture in accordance with the principles of the invention.

FIG. 2 illustrates a logical architecture of an exemplary CMTS 10 to facilitate an understanding of the invention. As illustrated in FIG. 2, CMTS 10 may contain a processing unit 100 which may access a RAM 106 and a ROM 104, and may control the operation of the CMTS 10 and RF communication signals to be sent by the network elements 8 to the CMTS 10. Processing unit 100 preferably contains a microprocessor 102 which may receive information, such as instructions and data, from a ROM 104 or RAM 106. Processing unit 100 is preferably connected to a display 108, such as a CRT or LCD display, which may display status information such as whether a station maintenance (SM) is being performed or a receiver is in need of load balancing. An input keypad 110 may also be connected to processing unit 100 and may allow an operator to provide instructions, processing requests and/or data to processor 100.

RF transceiver (transmitter/receiver) unit 3 preferably contains a plurality of transmitters 4 and receivers 2 to provide bidirectional communication with a plurality of network elements 8 through optical transceivers 16, nodes 12 and a plurality of network taps (not shown). Those of skill in the art will appreciate that CMTS 10 may contain a plurality of RF receivers 2, e.g. 8 RF receivers and a spare RF receiver. Each RF receiver 2 may support over 100 network elements. The RF receiver 2, such as a Broadcom 3140 receiver, preferably provides the received RF signals to an equalizer (not shown) which is used to acquire equalizer values and burst modulation error ratio (MER) measurements, packet error rate (PER) and bit error rate (BER). The equalizer is preferably a multiple tap linear equalizer (e.g. a 24 tap linear equalizer), which also may be known as a feed forward equalizer (FFE). The equalizer may be integrally contained in RF receiver 2 or may be a separate device. The communication characteristics of each receiver 2 may be stored on ROM 104 or RAM 106, or may be provided from an external source, such as headend 14. RAM 104 and/or ROM 106 may also carry instructions for microprocessor 102.

RF receiver 2 may also include a Fast Fourier Transform (FFT) module 108 such as a Broadcom 3140 receiver FFT, identifies frequencies in the optical signals received and provides desired frequencies to power monitoring unit 120. Preferably, the FFT supports different windows, and sample lengths (256, 512, 1024, 2048) with an output of frequency of 0-81.92 MHz. Minimum resolution results from maximum window length of 2048 samples and yields an FFT cell resolution of 80 kHz.

Figure 3:
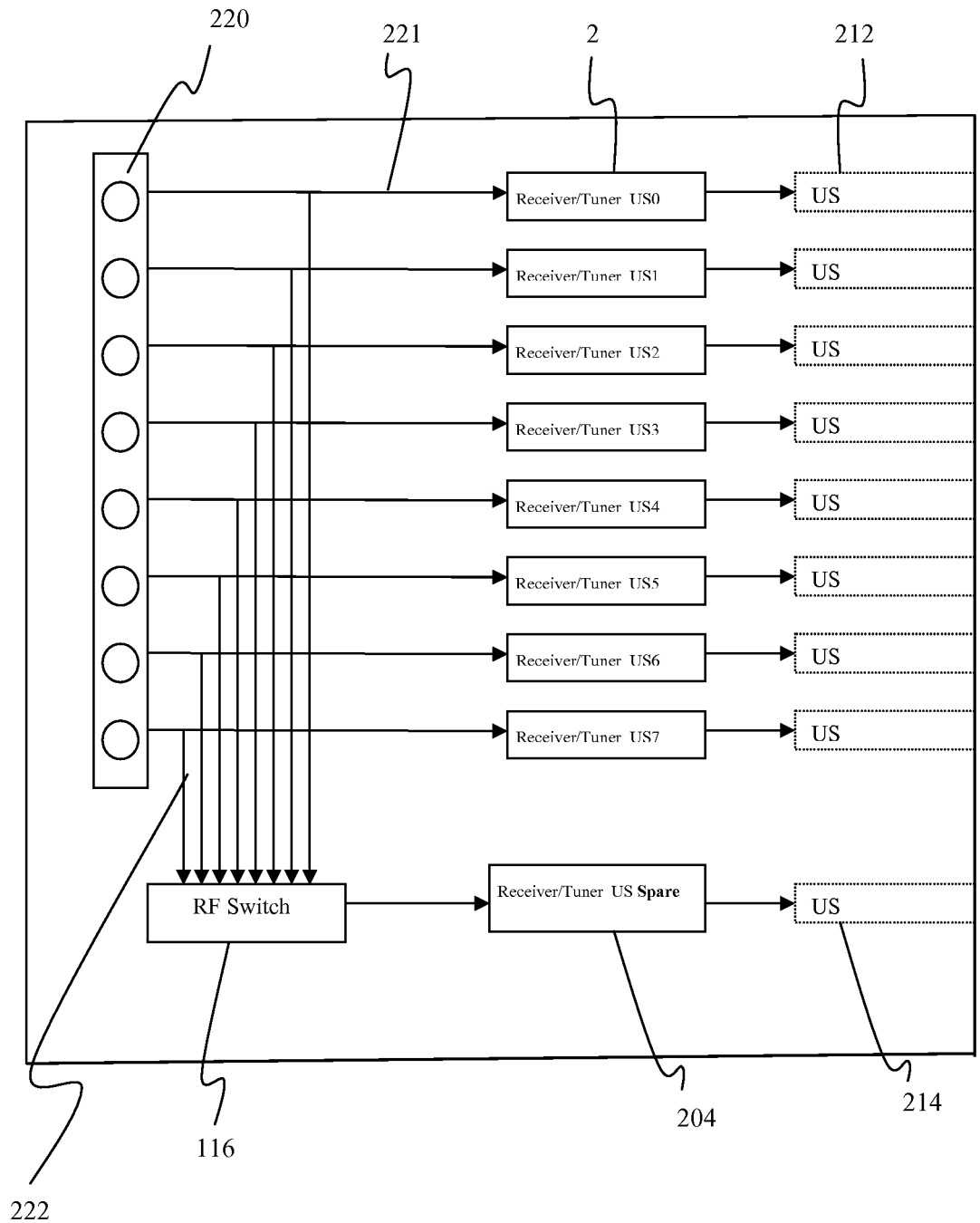
FIG. 3 illustrates an exemplary receiver arrangement which may communicate with an exemplary CMTS of the present invention.

FIG. 3 illustrates a logical arrangement of a group of receivers 2 to facilitate an understanding of the invention. As illustrated in FIG. 3 a spare receiver 204 may be tapped into each of the primary receiver ports 220 (e.g. R0-R7) in a non-intrusive manner. As illustrated, CMTS receiver ports 220, which may be in the form of Amphenol connectors, are provided to allow cables, e.g. coaxial cables, (not shown) to be connected with primary receivers 2. The receivers 2 provide data signals to CMTS 10 through ports 212, and spare receiver 204 provides data signals to CMTS 10 through port 214.

Spare receiver 204 preferably taps into signal lines 221 of primary receiver ports 220 via signal lines 222, and the taps are preferably located where the cable signal comes from receiver ports 220 into the receivers 2 so both the connected primary receiver 2 and the spare receiver 204 may receive the same signal. Those of skill in the art will appreciate that each of the primary receivers 2 (e.g. receivers R0-R7) receive signals according to different communication characteristics, e.g. communication on a different frequency (RF band) and communication protocols. Spare receiver 204 is preferably tunable to the RF bands of each of the primary receivers 2. Preferably, the spare receiver 204 connects (matrices) with only one primary receiver 2 at a time.

When a cable operator initiates a testing operation they may select any registered network element of their choice or the CMTS 10 may select the network element for them. Once the network element has been selected it is moved (tuned to the frequency) to the spare receiver testing data is passed to it and the results are measured. Once the testing measurements are completed the network element is moved back (instructed to retune to frequency of the primary receiver) to its original primary receiver. This whole process is preferably performed without deregistering the network element from the network to avoid disrupting the subscriber's service or any other services on the primary receiver to other subscribers.

Figure 4:
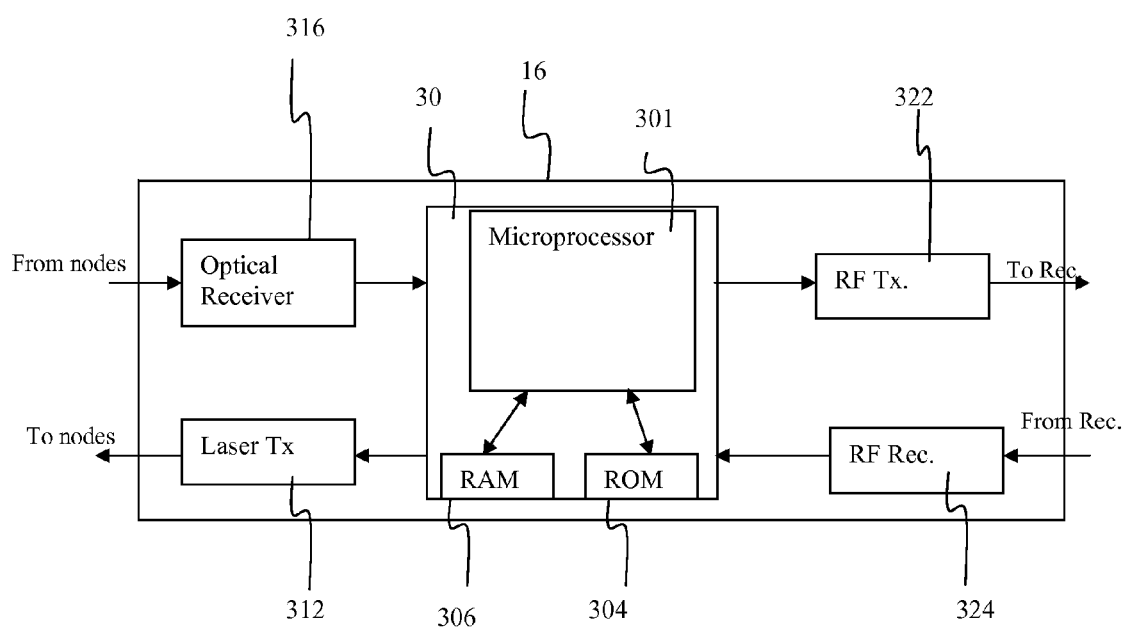
FIG. 4 illustrates an exemplary architecture of an optical transceiver in a headend which may contain an exemplary CMTS of the present invention.

FIG. 4 illustrates further detail of an exemplary optical transceiver 16 in headend 14. Optical transceiver 16 preferably includes an optical receiver 316 configured to receive optical signals through an optical fiber from nodes 12. A laser transmitter 312 provides downstream optical communications to nodes 12 through an optical fiber. Laser transmitter 312 is typically assigned to communicate with a single node. Signals received by the optical receiver 316 converted to RF signals and transmitted to by RF transmitter 322 to the receivers 2. Signals from the receivers 2 are received by RF receiver 324 and provided to laser transmitter 312 for transmission to the nodes 12. CPU 30 preferably contains a microprocessor 301 which interacts with RAM 306 and ROM 304 and controls the operation of the receiver 316 and the laser 312.

Upon receiving a downstream communication signal from a network element, via CMTS 10, CPU 30 preferably provides instructions to modulate one of the laser transmitters 312 to transmit the communication signal to nodes 12. Optical receivers 316 are preferably configured to monitor the optical signal transmitted by nodes 12, such as by receiving a portion of the signal.

Figure 5:
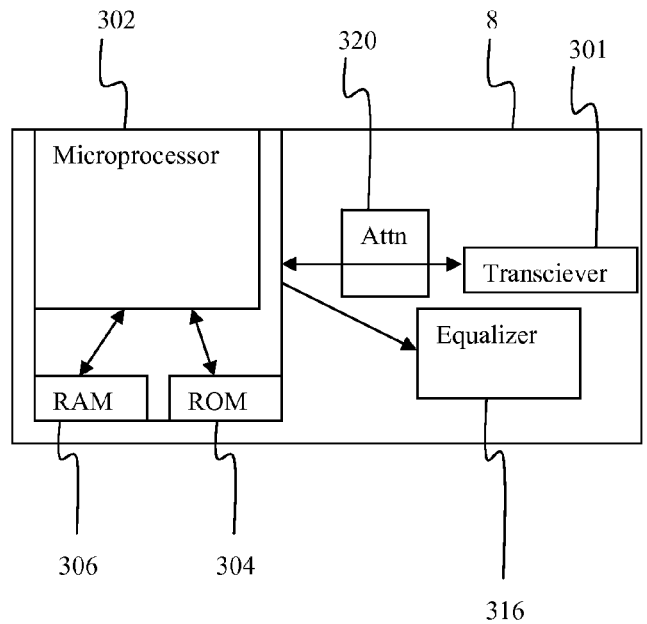
FIG. 5 illustrates an exemplary architecture of a network element which may communicate with an exemplary CMTS of the present invention.

FIG. 5 illustrates an exemplary network element 8, such as a cable modem. Network element 8 preferably contains a processor 302 which may communicate with a RAM 306 and ROM 304, and which controls the general operation of the network element 8, including the pre-equalization parameters and preamble lengths of communications sent by the network element in accordance with instructions from the CMTS 10. Network element 8 also contains a transceiver (which includes a transmitter and receiver) which provides bidirectional RF communication with CMTS 10. Network element 8 may also contain an equalizer unit 316 which may equalize the communications received from and sent to CMTS 10. Network element 8 may also contain an attenuator 320 which may be controlled by microprocessor to attenuate signals to be transmitted to be within a desired power level. Those of skill in the art will appreciate that the components of network element 8 have been illustrated separately only for discussion purposes and that various components may be combined in practice.

In a preferred implementation, the present invention may use a DOCSIS network element, such as a cable modem, to generate the test signals. Accordingly, the test signals may be implemented using one of the available upstream DOCSIS bandwidths, e.g. 200 kHz, 400 kHz, 800 kHz, 1600 kHz, 3200 kHz or 6400 kHz. A preferred implementation may use the narrow 800 kHz bandwidth at the upper band edge where diplexer rolloff is significant since narrow bandwidths minimize the amount of clean spectrum required within the return path, and because many modems have problems with the 400 and 200 kHz widths. Wider bandwidths may be used where available spectrum permits in order to gain improved resolution in the measurements.

Figure 6:
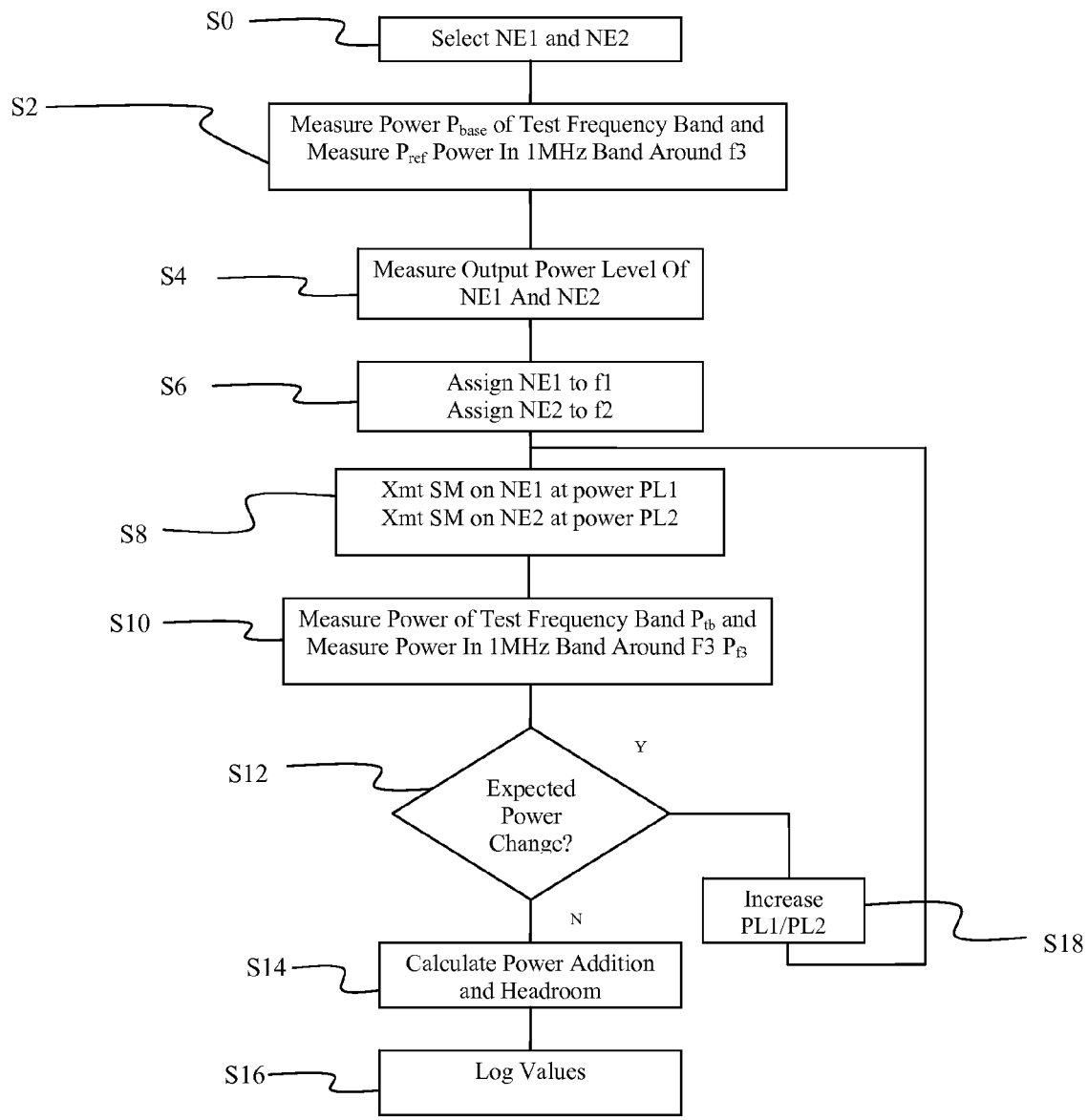
FIG. 6 illustrates an exemplary process in accordance with the principles of the present invention.

An exemplary process for automatically determining the dynamic range of the optical link in the network, e.g. on an optical node is illustrated in FIG. 6. As illustrated in step S0 of FIG. 6, two network elements NE1 and NE2 are selected to be used in the process. Preferably, the two modems are connected to the same HFC node and return laser, are currently idle, have sufficient ability to have their transmit power turned up by (15) dB, and can be controlled remotely by the CMTS to move to new frequencies at command and change their transmission power level. The two network elements will be instructed to transmit on a channel which impacts the test frequency, whose power is increased sufficiently to cause loading (compression) of the RF devices (most likely the return laser transmitter) in the system.

As illustrated in step S2 of FIG. 6, the power of the test frequency band ($P_{base}$), e.g. the expected band for the test frequency f3, such as 42-52 MHz, is measured, and the power in a 1 MHz band around f3 ($P_{ref}$) is measured. These measurements provide a reference baseline power of the test frequency band, as illustrated in FIG. 6. In a preferred implementation, these measurements may be performed as an incremental power measurement of the band of interest (42-52) MHz and may be recorded showing amplitude vs. frequency for at least 10 times showing occupied frequency bands and periodicity of channels on the network and to eliminate the possibility that a coincidental ingress happened at the exact same instance as the measurement. An estimation of the total network RF power vs. single channel power may also be mathematically estimated from measured data.

The output power level of the selected network elements NE1 and NE2 is determined in step S4. The power may be measured at the CMTS, for example by measuring the received RF power at FFT module 108 and Power monitor module 120. Alternatively, power may be determined from the settings on attenuator 320 of network element 8. The measured power of network elements NE1 and NE2 preferably serve as the nominal power setting for PL1 and PL2 in the test.

As illustrated in step S6 of FIG. 6, network element 1 is assigned to frequency f1 and network element 2 is assigned to frequency f2. Preferably, the f1 and/or f2 are vacant frequency slots which can occupy QSPK, 800 kS/sec. It is assumed that the output power level of the network elements NE1 and NE2 will not change with the assignment of new frequencies. Preferably, the measured power level will be the initial power levels PL1 and PL2, respectively.

Ideally, we want to find two frequencies f1 and f2 to assign network elements NE1 and NE2 which produce a $2^{nd}$ order intermod at a third frequency (the test frequency) in the test frequency band of about 42-52 MHz. Each of the three frequencies are preferably within the 5-42 MHz spectrum. The possible frequencies may be identified by a plurality of techniques, such as by empirically determining usable frequency regions for QPSK (quadrature phase shift keying, also referred to as four QAM) transmission from a survey process. The two frequencies are also preferably selected such that the second order products (f3) from these frequencies do not fall on desired traffic in the network, if possible. Preferably, frequencies f1 and f2 can be activated as DOCSIS upstream channels with default upstream CMTS receive levels without causing any significant harm to any other active services.

As illustrated in step S8 of FIG. 6, network elements NE1 and NE2 are instructed to transmit signals at the initial power level PL1 and PL2, respectively so that the signal from the first network element and the signal from the second network element interfere with each other to produce a third signal at a third frequency. Accordingly, the signals may be transmitted simultaneously or the transmission of one of the signals from one of the network element may be delay to accommodate for transmission delays in the network to make sure the respective signals from the first network element NE1 and the second network element NE2 are received by their common node at the same time. PL1 and PL2 may be the same power level and may be at level L which was assigned as the nominal power level. In this step, network elements 1 and 2 are preferably instructed to perform a station maintenance (SM) burst at exactly the same time. Those of skill in the art will appreciate that this may be done by lining up the minislots in the MAPS for the two upstream channels associated with network elements A and B. Those of skill in the art will also appreciate that the MAP or MAPS data provide a schedule of time slots which allocates different network elements specific time intervals in which they are allowed to transmit data to the CMTS. From a CMTS software perspective, this should not be a complicated problem as the IM broadcast intervals are already aligned across all channels within a single spectrum group. The FFT processor should also be configured to trigger samples based upon the MAP minislot interval when the two SM bursts from the network elements will align.

The power of the test frequency band ($P_{tb}$), e.g. the expected band for the test frequency f3, such as 42-52 MHz, is measured, and the power in a 1 MHz band around f3 ($P_{f3}$) is measured again, as illustrated in step S10. The power may be measured at the CMTS, for example by measuring the received RF power at FFT module 108 and Power monitor module 120. Alternatively, power may be determined from the settings on attenuator 320 of network element 8. It may be desirable to perform steps S8 and S10 a number of times (e.g. 10 times) to eliminate the possibility that a coincidental ingress happened at the exact same instance as the SM bursts, which may affect the power measurement. In doing so, an average measured power, a mean measured power or a lowest value of measured power may be used.

The CMTS spare receiver may be used to make the power measurements to avoid impacting service provided to customers. Alternatively, another receiver could be used to make the measurements by being taken "off line" or by adjusting for the impact caused by normal service.

If the simultaneous transmission has increased the power levels in the test frequency band and the 1 MHz bandwidth around the test frequency in a predictable expected manner (e.g. by 9 dB for a 3 dB increase in power by NE1 and NE2), step S12, Yes, the optical link is not degrading the signals, so the power levels PL1 and/or PL2 are increased, such as by 3 dB, step S18. Steps S8 through S12 are repeated with the increased transmit power levels. If the simultaneous transmission has increased the power levels in the test frequency band and the 1 MHz bandwidth around the test frequency in an unpredictable manner, step S12, No, the optical link is degrading the signals, such as by clipping the signals. The measured power levels of the test frequency band (Ptb) and the 1 MHz band around f3 (Pf3) are compared with the initial power of the test frequency band (Pbase) and the 1 MHz band around f3 (Pf3), from step S2 to determine the power added, which provides the available headroom in the optical link prior to degrading the signals. The measured and calculated values are logged in step S16.

The processes in FIG. 6 may be implemented in hard wired devices, firmware or software running in a processor. A processing unit for a software or firmware implementation is preferably contained in the CMTS. Any of the processes illustrated in FIG. 6 may be contained on a computer readable medium which may be read by microprocessor 102. A computer readable medium may be any medium capable of carrying instructions to be performed by a microprocessor, including a CD disc, DVD disc, magnetic or optical disc, tape, silicon based removable or non-removable memory, packetized or non-packetized wireline or wireless transmission signals.

The invention enables the technician or engineer to remotely characterize upstream dynamic range (or headroom) of optical links at a central location, such as the headened, such as by using the Motorola BSR64000, rather than using external test equipment, such as the vector signal analyzer and deploying technicians to various locations within the cable plant. The invention also avoids impacting active services. It also allows the cable operator to plan for future offerings and schedule needed maintenance by allowing periodic monitoring of the dynamic range of the optical link. All measurements may be made through the use of the existing terminal devices (specifically, DOCSIS terminal devices such as MTAs and cable modems) as well as headend equipment (specifically a DOCSIS CMTS).

Accurate knowledge of the dynamic range (or headroom) of an optical link will enable an operator to utilize the available resources of their network more efficiently, such as by adding additional network elements to portions of the network with a small headroom to avoid disruption of the signals from the optical link and to improve signal quality and network speed.

What is claimed is:
1. An apparatus for measuring a network comprising:
    a controller configured to instruct a first network element to transmit a first signal at a first frequency f1 and a second network element to transmit a second signal at a second frequency f2 so that the first signal and the second signal are received by a common node at the same time;

a receiver configured to receive communications on a third frequency f3 based on the first signal from the first network element and the second signal from the second network element, whereby the third frequency f3 is a combination of the first signal from the first network element at the first frequency f1 and the second signal from the second network element at the second frequency f2; and a power monitoring unit which is configured to measure power levels in an RF band comprising the third frequency while receiving signals on the third frequency, wherein the controller is configured to determine a dynamic range of an optical link based on the measured power levels in the RF band comprising the third frequency.

2. The apparatus of claim 1, wherein the power monitoring unit is further configured to measure power levels in an expected frequency band of the third frequency, the expected frequency band being less than an assigned communication bandwidth of an upstream communication bandwidth of the network.

3. The apparatus of claim 2, wherein the power monitoring unit is further configured to measure power in a 1 MHz band around the third frequency f3.

4. The apparatus of claim 1, wherein the controller is configured to determine an upper limit to the dynamic range of the optical link by determining when an increase in power level in frequency f3 is not in a predictable manner.

5. The apparatus of claim 4, wherein the controller is configured to instruct at least one of the first network element or the second network element to increase transmission power of the first signal or the second signal, respectively, when the upper limit of the dynamic range of the optical link has not been reached.

6. The apparatus of claim 1, wherein the first frequency f1 and the second frequency f2 are selected so that an interaction between f1 and f2 produces an intermodulation frequency at the third frequency f3.

7. A method for determining a dynamic range of an optical link in a network comprising the steps of:

selecting, by a microprocessor, a first network element to transmit a first signal at a first frequency f1 and a second network element to transmit a second signal at a second frequency f2 so that the first signal and the second signal are received by a common node at the same time;

receiving communications, by a receiver, on a third frequency f3, whereby the third frequency f3 is a combination of the first signal from the first network element at the first frequency f1 and the second signal from the second network element at the second frequency f2;

measuring power in signals contained in the third frequency; and determining a dynamic range of the optical link based on the measured power levels in the RF band comprising the third frequency.

8. The method of claim 7, wherein the step of measuring power measures power in an expected frequency band of the third frequency, the expected frequency band being less than an assigned communication bandwidth of an upstream communication bandwidth of the network.

9. The method of claim 8, wherein the step of measuring power measures power in a 1 MHz band around the third frequency f3.

10. The method of claim 7, wherein the step of determining a dynamic range of an optical link determines an upper limit to the dynamic range of the optical link by determining when an increase in power level in frequency f3 is not in a predictable manner.

11. The method of claim 7, further comprising the step of instructing at least one of the first network element or the second network element to increase transmission power of the first signal or the second signal, respectively, when an upper limit of the dynamic range of the optical link has not been reached.

12. The method of claim 7, wherein the first frequency f1 and the second frequency f2 are selected so that an interaction between f1 and f2 produces an intermodulation frequency at the third frequency f3.

13. A non-transitory computer readable medium comprising stored instructions which, when executed by one or more processors of a computer, cause the computer to perform steps of a method for determining a dynamic range of an optical link in a network comprising:

selecting a first network element to transmit a first signal at a first frequency f1 and a second network element to transmit a second signal at a second frequency f2 so that the first signal and the second signal are received by a common node at the same time;

receiving communications on a third frequency f3, whereby the third frequency f3 is a combination of the first signal from the first network element at the first frequency f1 and the second signal from the second network element at the second frequency f2;

measuring power in signals contained in the third frequency; and determining a dynamic range of the optical link based on the measured power levels in the RF band comprising the third frequency.

14. The computer readable medium of claim 13, wherein the step of measuring power measures power in an expected frequency band of the third frequency, the expected frequency bandwidth being less than an assigned communication bandwidth of an upstream communication bandwidth of the network.

15. The computer readable medium of claim 14, wherein the step of measuring power measures power in a 1 MHz band around the third frequency f3.

16. The computer readable medium of claim 13, wherein the step of determining a dynamic range of an optical link determines an upper limit to the dynamic range of the optical link by determining when an increase in power level in frequency f3 is not in a predictable manner.

17. The computer readable medium of claim 13, the steps further comprising instructing at least one of the first network element or the second network element to increase transmission power of the first signal or the second signal, respectively, when an upper limit of the dynamic range of the optical link has not been reached.

18. The computer readable medium of claim 13, wherein the first frequency f1 and the second frequency f2 are selected so that an interaction between f1 and f2 produces an intermodulation frequency at the third frequency f3.

* * * * *